United States Patent
Feldbaum et al.

(10) Patent No.: US 7,715,147 B2
(45) Date of Patent: May 11, 2010

(54) MAGNETIC WRITE HEAD HAVING A SHIELD THAT EXTENDS BELOW THE LEADING EDGE OF THE WRITE POLE

(75) Inventors: Michael Feldbaum, San Jose, CA (US); Quang Le, San Jose, CA (US); Aron Pentek, San Jose, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 683 days.

(21) Appl. No.: 11/588,961

(22) Filed: Oct. 27, 2006

(65) Prior Publication Data

US 2008/0100959 A1 May 1, 2008

(51) Int. Cl.
G11B 5/187 (2006.01)
G11B 5/11 (2006.01)

(52) U.S. Cl. ............................. 360/125.3; 360/125.03
(58) Field of Classification Search ............ 360/125.03, 360/125.2, 125.3
See application file for complete search history.

(56) References Cited

U.S. PATENT DOCUMENTS

| | | | |
|---|---|---|---|
| 5,075,956 A | 12/1991 | Das | 29/603 |
| 6,195,229 B1 | 2/2001 | Shen et al. | 360/113 |
| 2005/0068669 A1* | 3/2005 | Hsu et al. | 360/125 |
| 2005/0083605 A1 | 4/2005 | Hu et al. | 360/125 |
| 2005/0141146 A1 | 6/2005 | Pinarbasi | 360/324.1 |
| 2005/0243463 A1 | 11/2005 | Fontana, Jr. et al. | 360/126 |
| 2005/0259355 A1 | 11/2005 | Gao et al. | 360/125 |
| 2007/0019327 A1* | 1/2007 | Maruyama et al. | 360/126 |
| 2007/0146929 A1* | 6/2007 | Maruyama et al. | 360/125 |
| 2007/0146930 A1* | 6/2007 | Hsu et al. | 360/125 |
| 2007/0253107 A1* | 11/2007 | Mochizuki et al. | 360/126 |
| 2008/0112081 A1* | 5/2008 | Matono | 360/125.08 |

* cited by examiner

Primary Examiner—Jefferson Evans
(74) Attorney, Agent, or Firm—Zilka-Kotab, PC

(57) ABSTRACT

A magnetic write head for perpendicular magnetic recording that has a write pole and a trailing or side shield that has a leading edge that extends to or beyond the leading edge of write pole, thereby ensuring complete side magnetic shielding. The write head can be formed by forming the write pole on a non-magnetic substrate that is constructed of a material that can be readily removed by reactive ion etching (RIE). The write pole can be formed by depositing a layer of magnetic write pole material over the substrate and then forming a mask over the magnetic write pole material. An ion mill can be performed to define the write pole, and then a reactive ion etch can be performed to notch the substrate, so that when a non-magnetic shield gap material is deposited it will be below or at the bottom of the write pole. Then a magnetic shield material can be deposited to form a shield having a leading edge that extends beyond the leading edge of the write pole.

13 Claims, 16 Drawing Sheets

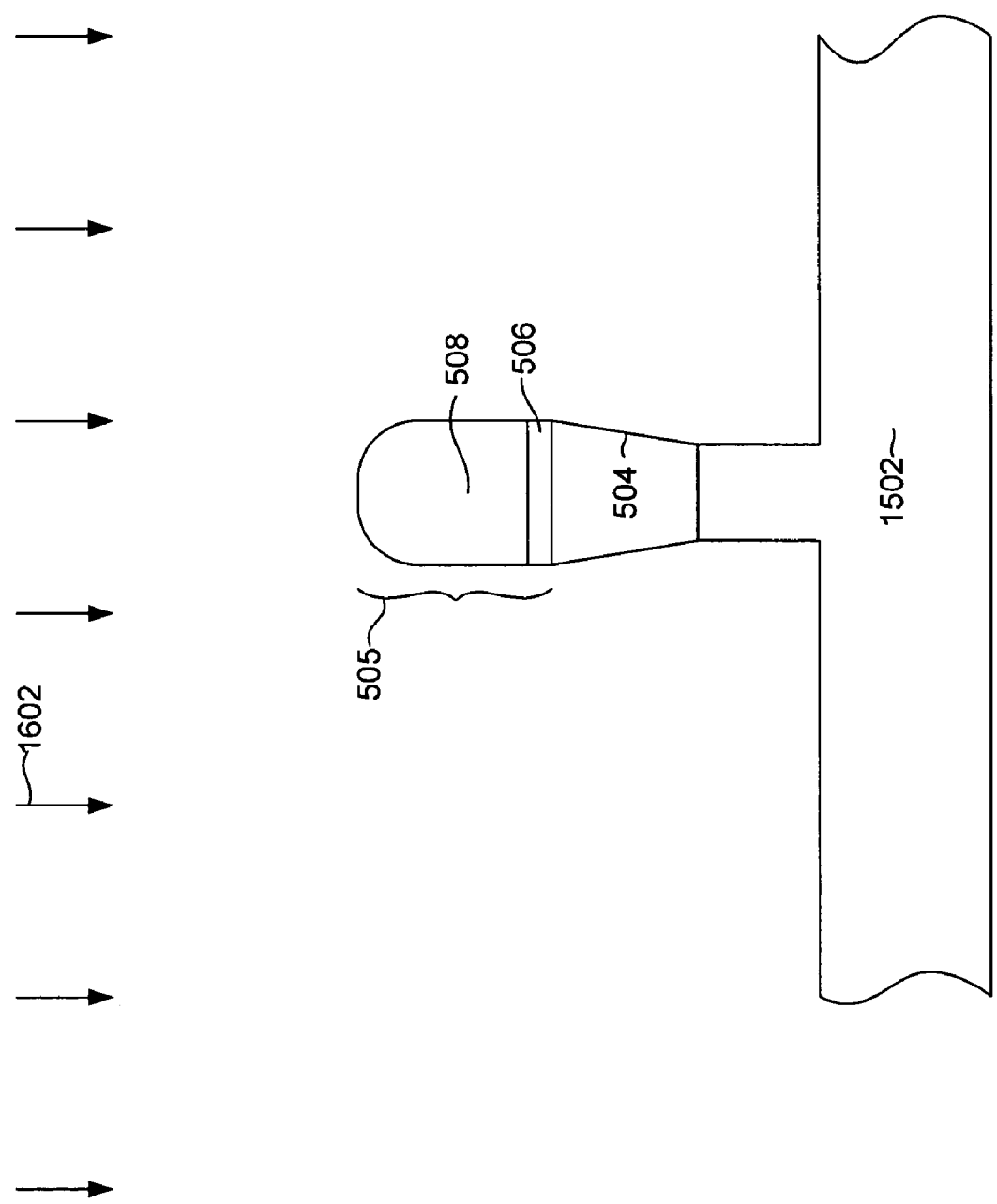

MAGNETIC WRITE HEAD HAVING A SHIELD THAT EXTENDS BELOW THE LEADING EDGE OF THE WRITE POLE

FIELD OF THE INVENTION

The present invention relates to perpendicular magnetic recording and more particularly to a method for manufacturing a write head for perpendicular magnetic recording that has a trailing shield that extends beyond the leading edge of the write pole.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One feature of perpendicular recording systems is that the low coercivity underlayer of the magnetic medium is particularly susceptible to stray magnetic fields. Unintended magnetic fields, such as from structures of the write head other than the write pole and even coming from the sides of the write pole itself can inadvertently write to portions of the medium that are outside of the intended trackwidth.

Another feature of perpendicular magnetic systems is that the magnetism of the high coercivity magnetic medium can be difficult to quickly switch. It is desired that the system have a high field gradient at transitions so that the magnetic state of the medium can be quickly switched from one direction to another.

Therefore, there is a need for a magnetic write head for perpendicular recording that can effectively avoid stray magnetic fields from inadvertently writing to the magnetic medium. There is also a need for a write head structure that can increase magnetic field gradient, allowing fast switching of the magnetic medium from one magnetic state to another.

SUMMARY OF THE INVENTION

The present invention provides a magnetic write head for perpendicular magnetic recording that has a magnetic shield that provides magnetic shielding at the sides of the write pole, wherein the magnetic shield extends to or beyond the leading edge of the write pole. The shield is separated from the write pole by a non-magnetic shield gap material.

The shield can be either a trailing shield that wraps around the write pole to include side shield portions or can be purely a side shield that extends laterally to either side of the write pole without providing a trailing shield function. The write pole is constructed upon a substrate that can be readily removed by reactive ion etching, this allows the substrate itself to be notched by a reactive ion etch without damaging the write pole by an extended ion milling.

The side portions of the shield prevent tray fields from writing outside of the desired trackwidth, and because the side portions of the shield extend to or beyond the leading edge of the write pole, this side shield completely shields the medium from these side fields. If the shield is also constructed as a trailing shield, the trailing portion increases the field gradient by drawing the write field toward it.

The notching of the substrate advantageously allows the write gap material to be deposited such that the top surface of the write gap material over the substrate is at or below the bottom surface (leading edge) of the write pole. A magnetic material can then be deposited to form a magnetic shield that extends beyond the bottom (or leading edge) of the write pole.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIG. 15-16 are views of a write head in intermediate stages of manufacture illustrating a method of manufacturing a write head according to another embodiment of the invention.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
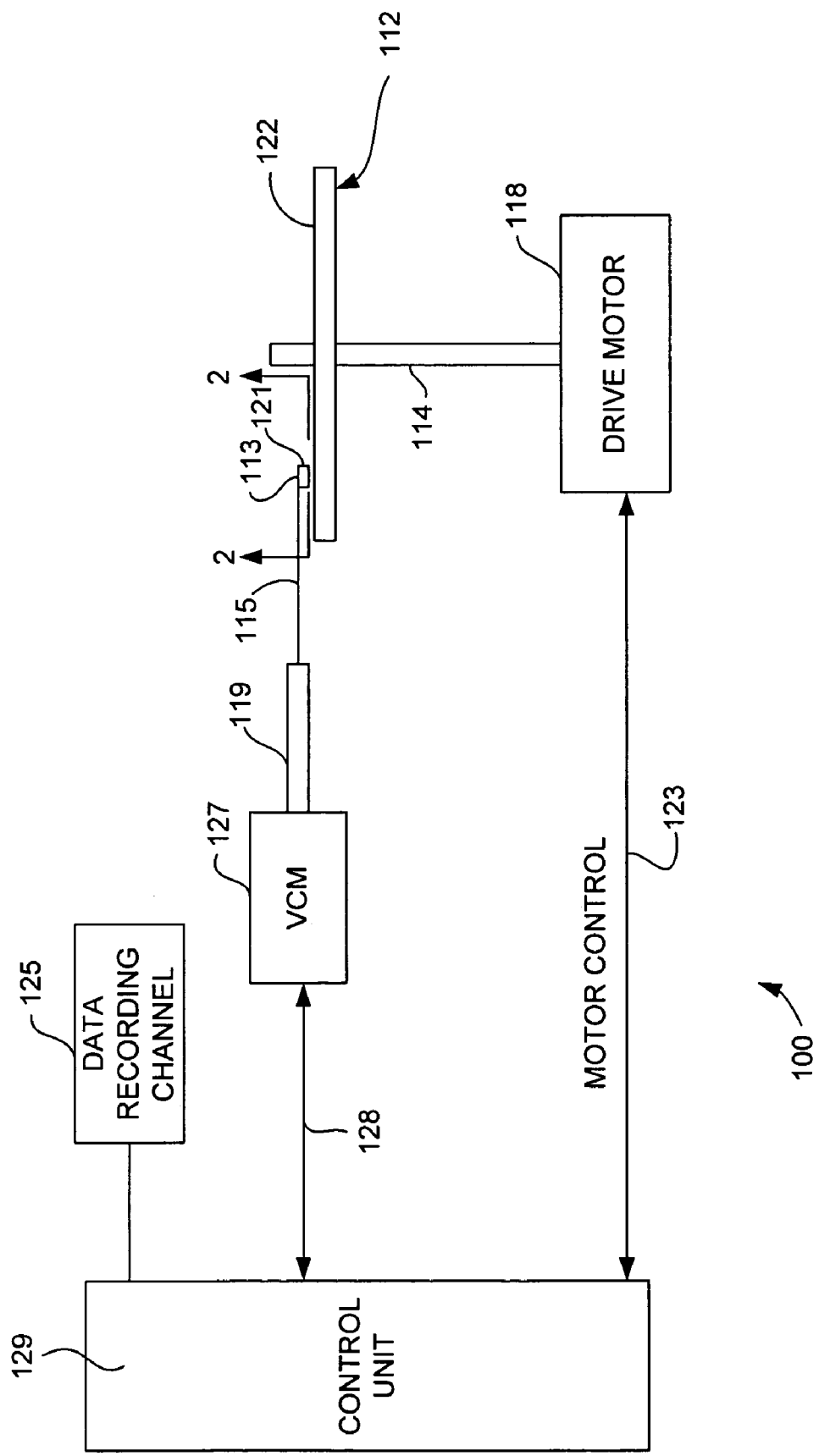
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
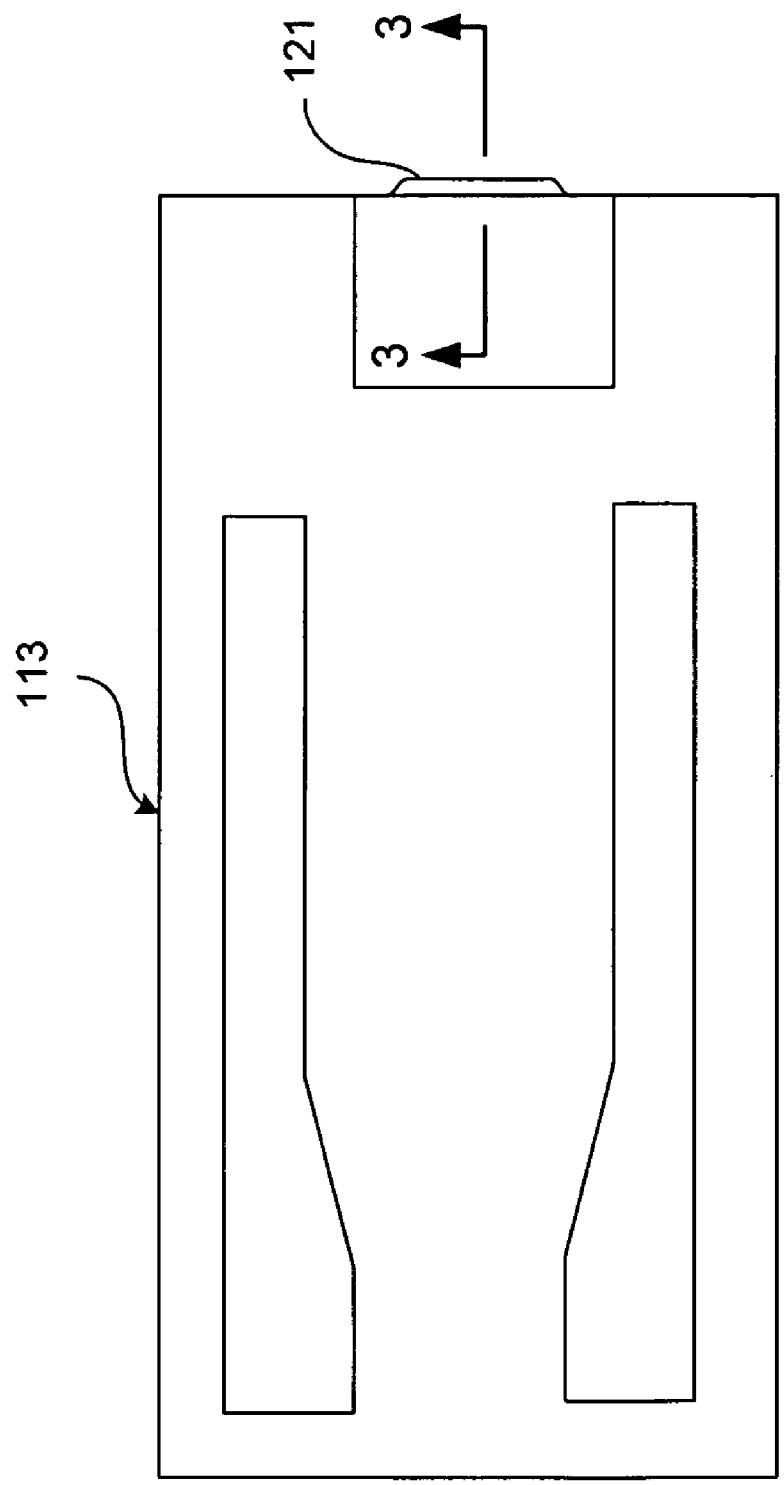
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
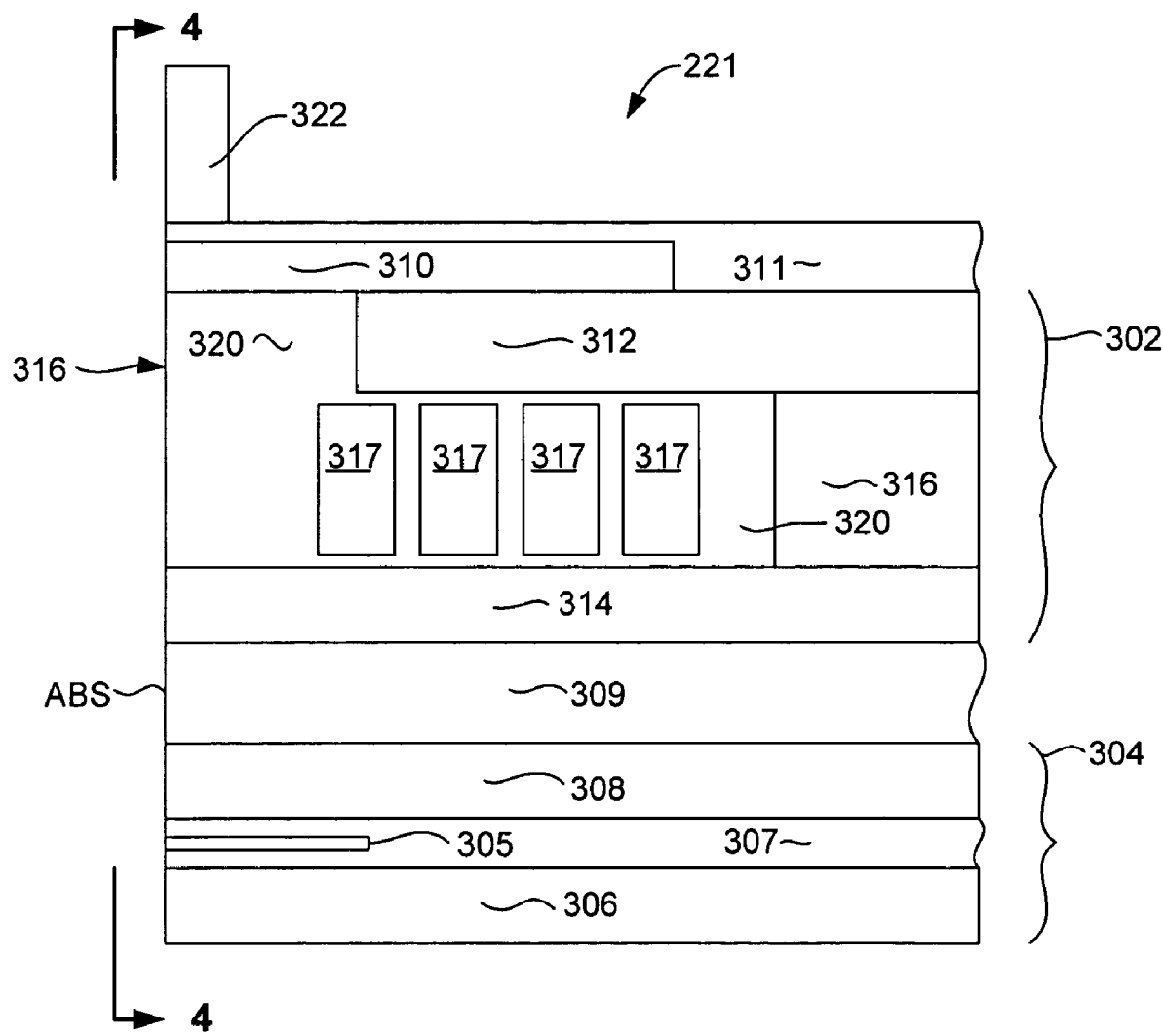
FIG. 3 is a cross sectional view, taken from line 3-3 of FIG. 2 and rotated 90 degrees counterclockwise, of a magnetic head according to an embodiment of the present invention.

With reference now to FIG. 3, the magnetic head 221 for use in a perpendicular magnetic recording system is described. The head 221 includes a write element 302 and a read element 304. The read element includes a magnetoresistive sensor 305, such as a current in plane giant magnetoresistive (CPP GMR) sensor. However, the sensor 305 could be another type of sensor such as a current perpendicular to plane (CPP) GMR sensor or, a tunnel junction sensor (TMR) or some other type of sensor. The sensor 305 is located between and insulated from first and second magnetic shields 306, 308 and embedded in a dielectric material 307. The magnetic shields 306, 308, which can be constructed of for example CoFe or NiFe, absorb magnetic fields such as those from up-track or down track data signals, ensuring that the read sensor 304 only detects the desired data track located between the shields 306, 308. A non-magnetic, electrically insulating gap layer 309 may be provided between the shield 308 and the write head 302.

Figure 4:
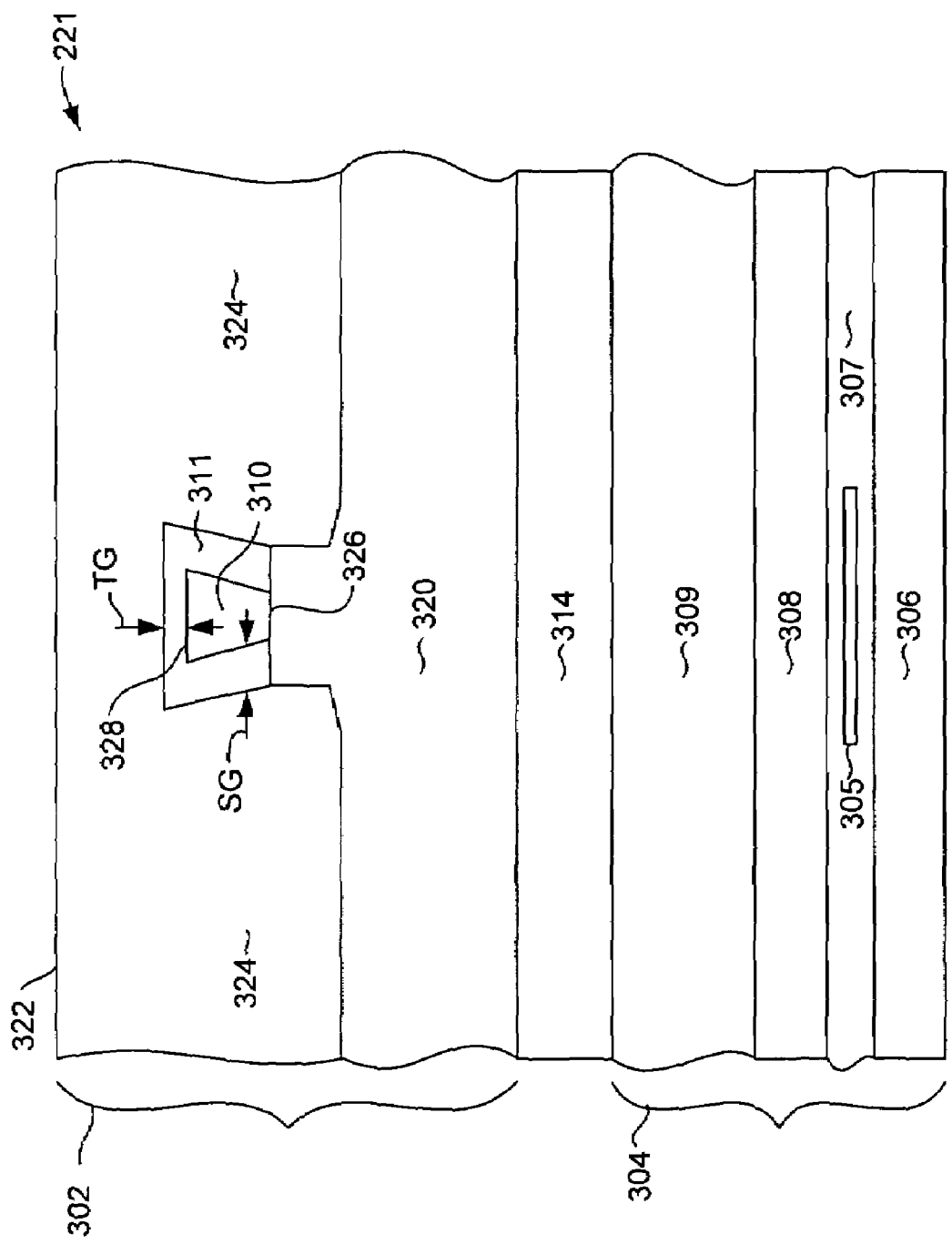
FIG. 4 is an ABS view of the write head taken from line 4-4 of FIG. 3.

With continued reference to FIG. 3, the write element 302 includes a write pole 310 that is magnetically connected with a magnetic shaping layer 312, and is embedded within an insulation material 311. The write pole 310 has a small cross section at the air bearing surface (as seen in FIG. 4) and is constructed of a material having a high saturation moment, such as NiFe or CoFe. More preferably, the write pole 310 is constructed as a lamination of layers of magnetic material separated by thin layers of non-magnetic material. The write element 302 also has a return pole 314 that preferably has a surface exposed at the ABS and has a cross section parallel with the ABS surface that is much larger than that of the write pole 310. The return pole 314 is magnetically connected with the shaping layer 312 by a back gap portion 316. The shaping layer 312, return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown in FIGS. 3 and 4). The insulation layers 320 can be constructed of a material such as alumina ($Al_2O_3$) or can be constructed as various layers of the same or different electrically insulating, non-magnetic materials.

With reference to FIG. 4, the write head element 302 may also include a trailing shield 322, which can be constructed of a magnetic material such as NiFe or some other material. With reference to FIG. 4, the trailing shield 322 is configured to wrap around the write pole 310 to provide side shielding as well as trailing shielding from stray magnetic fields. These stray magnetic fields can be from the write head 302 itself or could also be from adjacent track signals or from magnetic fields from external sources. The write pole 310 has a leading edge 326 and a trailing edge 328. The terms leading and trialing refer to the direction of travel over the magnetic medium when the write head 221 is un use.

Therefore, the trailing shield 322 has side portions 324. These side portions each have a leading edge 330 that extends at least to the leading edge 326 of the write pole 310 and which preferably extend beyond the leading edge 326 of the write pole 310. Extending the side portions 324 to or beyond the leading edge of the write pole, ensures that any side stray fields will be very effectively prevented from affecting the magnetic medium.

As can be seen, the trailing shield 322 is separated from the trailing edge 328 of the write pole 310 by a trailing gap (TG), and is separated from the laterally opposed sides of the write pole by a side gap (SG). The portion of the trailing shield 322 that is adjacent to the trailing edge 328 of the write pole 310 increases the field gradient of the write head. This is accomplished by drawing the write field toward this trailing portion of the trailing shield 322, which cants the write field a desired amount. Therefore, the write field is not perfectly perpendicular, but is canted somewhat in the trailing direction.

The trailing gap thickness TG involves a tradeoff. If the trailing gap TG is to large, field gradient will not be large enough. If the trailing shield gap TG is too small, and unacceptable amount of write field will be lost to the trailing shield, resulting in a weak write field. Therefore, the thickness of the trailing gap TG should be somewhat tightly controlled. The thickness of the side gaps SG is, however, not as critical. The side gaps SG are preferably larger than the trailing gap TG.

With reference still to FIG. 4, the write pole 310 preferably has a trapezoidal shape as viewed from the ABS. This trapezoidal shape, wherein the write pole 310 is narrower at the leading edge 326 than at the trailing edge prevents skew related adjacent track interference when the write head is located at inner and outer portions of magnetic disk (FIG. 1).

Although the write head 221 has been described as having a trailing, wrap around shield 322, the write head 221 could also be constructed with a side shield that does not provide a trailing function. Such a shield is not shown in FIG. 4, but is described below with reference to FIG. 14, as will be discussed below in a discussion of a method of constructing a write head according to embodiments of the invention. Such a write head having side shields that do not provide a trailing function might be desirable when increased write field gradient is not needed, but protection from side shields is needed. The side shield in such an embodiment would, however, extend to or beyond the leading edge 326 of the write pole 310.

With reference to FIGS. 5-14 a method for constructing a write head for perpendicular magnetic recording is described. The method allows the trailing shield to be formed so that it can extend to or beyond the leading edge of the write pole, thereby ensuring complete protection against side stray field writing.

Figure 5:
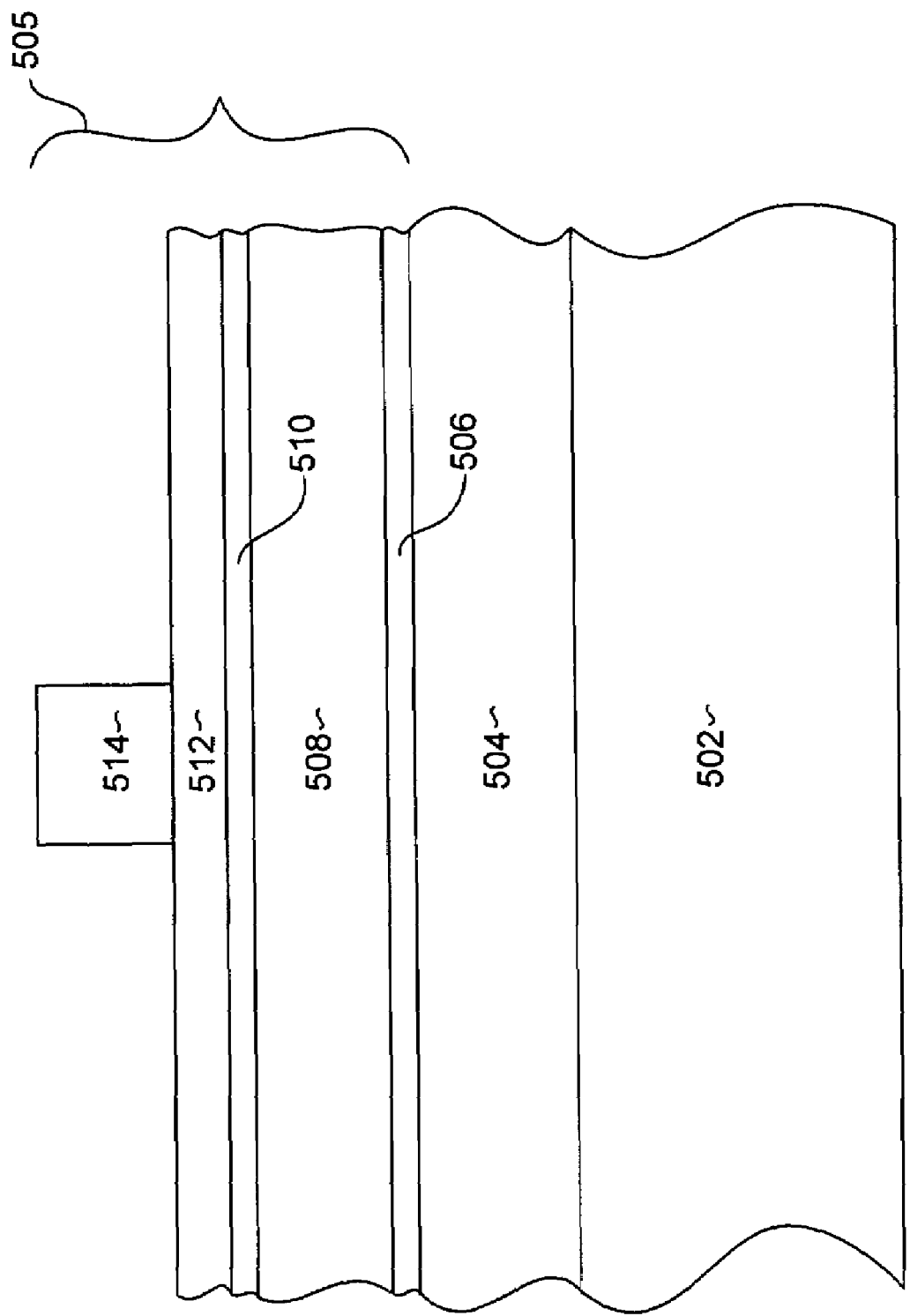
FIGS. 5-14 are views of a write head in various intermediate stages of manufacture illustrating a method of manufacturing a write head according to a possible embodiment of the invention.

With particular reference to FIG. 5, a substrate 502 is provided. This substrate 502 is a material that can be readily removed by a reactive ion etch (RIE) and can be called a RIEable substrate 502. Examples of RIAble materials of which the substrate 502 can be constructed include $Si_xN_y$, $SiO_2$, $Si_3N_4$, $Ta_2O_5$, and Ta. The RIEable substrate 502 can be formed with the shaping layer 312 (FIG. 3) (deposited during a shaping layer fill process and planarized by chemical mechanical polishing (CMP) to expose the top surface of the magnetic shaping layer 312) or can be a patch deposited and patterned parallel to the shaping layer's front edge at the ABS. For the patch define approach, one can control the depth of the shield 322 by controlling the initial thickness to which the RIEable substrate 502 is deposited. This allows better control and definition of the shield's depth. A magnetic write pole material 504 is deposited over the substrate 502. While various magnetic materials can be used for the write pole material 504, such as NiFe, CoFe, etc., the write pole material 504 is preferably deposited as a lamination of magnetic layers such as NiFe or CoFe separated by thin layers of non-magnetic material such as alumina ($Al_2O_3$) or some other non-magnetic material.

A series of one more mask layers 505 are deposited over the magnetic write pole material 504. The mask 505 may be one of many possible structures, but preferably includes a first or bottom hard mask 506, a first or bottom anti-reflective control (BARC) layer, a second hard mask layer 510, a second BARC layer 512 formed over the second hard mask 510, and a resist layer 514 such as photoresist or thermal image resist. The first hard mask can be constructed of a material such as diamond like carbon (DLC) or a thin alumina layer ($Al_2O_3$). The first hard mask may also be constructed of multiple layers of material, such as a layer of alumina and a layer of diamond like carbon (DLC). The first hard mask is preferably a material that is resistant to chemical mechanical polishing (CMP) and a material that can be removed by reactive ion etching (RIE).

The first and second BARC layers 508, 512 can be constructed of a polyimide material such as DURAMIDE® or some similar material. The second or top hard mask layer 510 can be constructed of, for example $SiO_2$. The resist mask 514 is photolithographically patterned and developed to form a mask configured to define a write pole.

Figure 6:
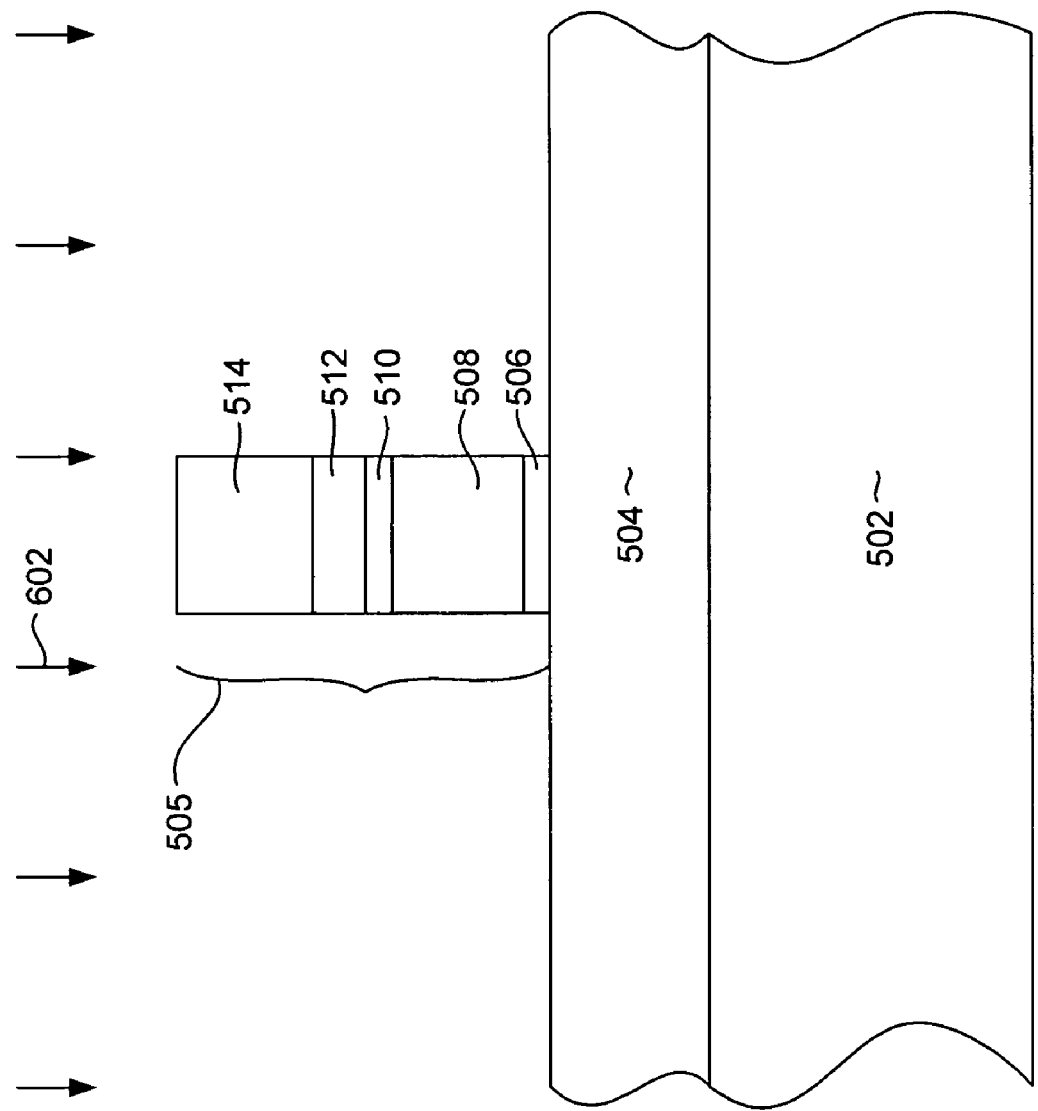
Figure 7:
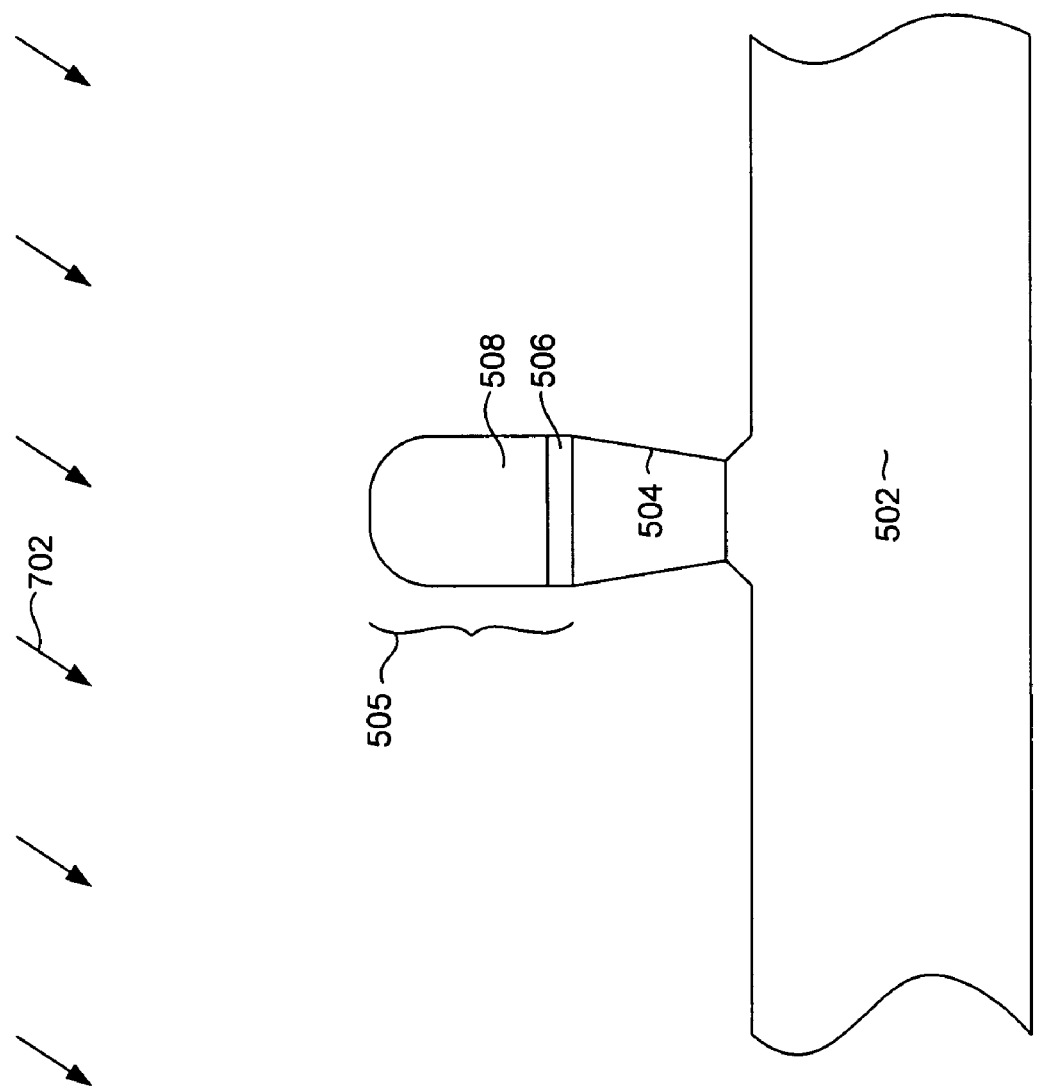

Then, with reference to FIG. 6, one or more material removal processes 602 such as reactive ion etching RIE or a combination of reactive ion etching and ion milling are performed to transfer the image of the resist mask 514 onto the underlying mask layers 512, 510, 508, 506. With reference now to FIG. 7, a material removal process 702 such as ion milling is performed to remove portions of the magnetic write pole material 504 that are not protected by the mask structure to form a write pole structure 504. As can be seen, a large portion of the mask structure 505 is consumed by the ion milling process 702. The ion milling process 702 is preferably performed at one or more angles relative to normal. The term normal, as used herein, refers to a direction perpendicular to the plane of the layers 502-514 as deposited as shown in FIG. 5. This ion mill 702 is also preferably performed as a sweeping ion mill while the wafer on which the materials are deposited is held on a rotating chuck. This angled, sweeping ion mill results in a write pole 504 having a desired tapered, trapezoidal shape. With reference still to FIG. 7, for reasons that will become apparent, it would be desirable that the substrate material 502 be notched significantly below the level of the bottom of the write pole material 504. However, performing a standard ion mill 702 sufficiently to notch deep into the substrate would consume an unacceptable amount of mask material 505 and would also damage the write pole.

Figure 8:
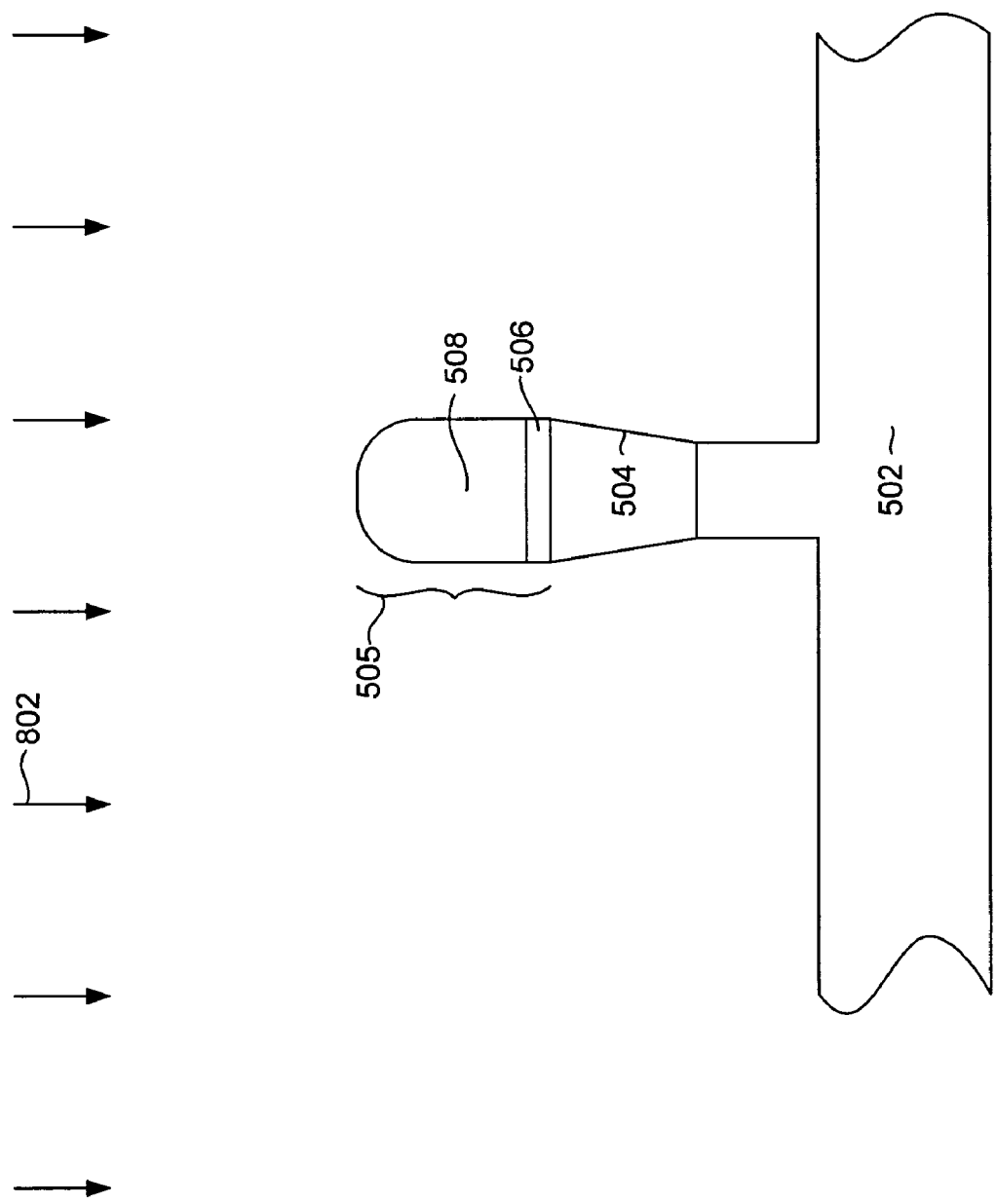

With reference now to FIG. 8, a reactive ion etch 802 is performed to remove a portion of the substrate material 502. As will be recalled, the substrate material has been constructed of a RIEable material so that it can be readily removed by reactive ion etching (RIE). Therefore, the RIE 802 can be used to form a sufficiently deep notch in the substrate 502, using the write pole 504 and mask structure 505 as a mask. The chemistries can be $CHF_3/CF_4$, etc.

Figure 9:
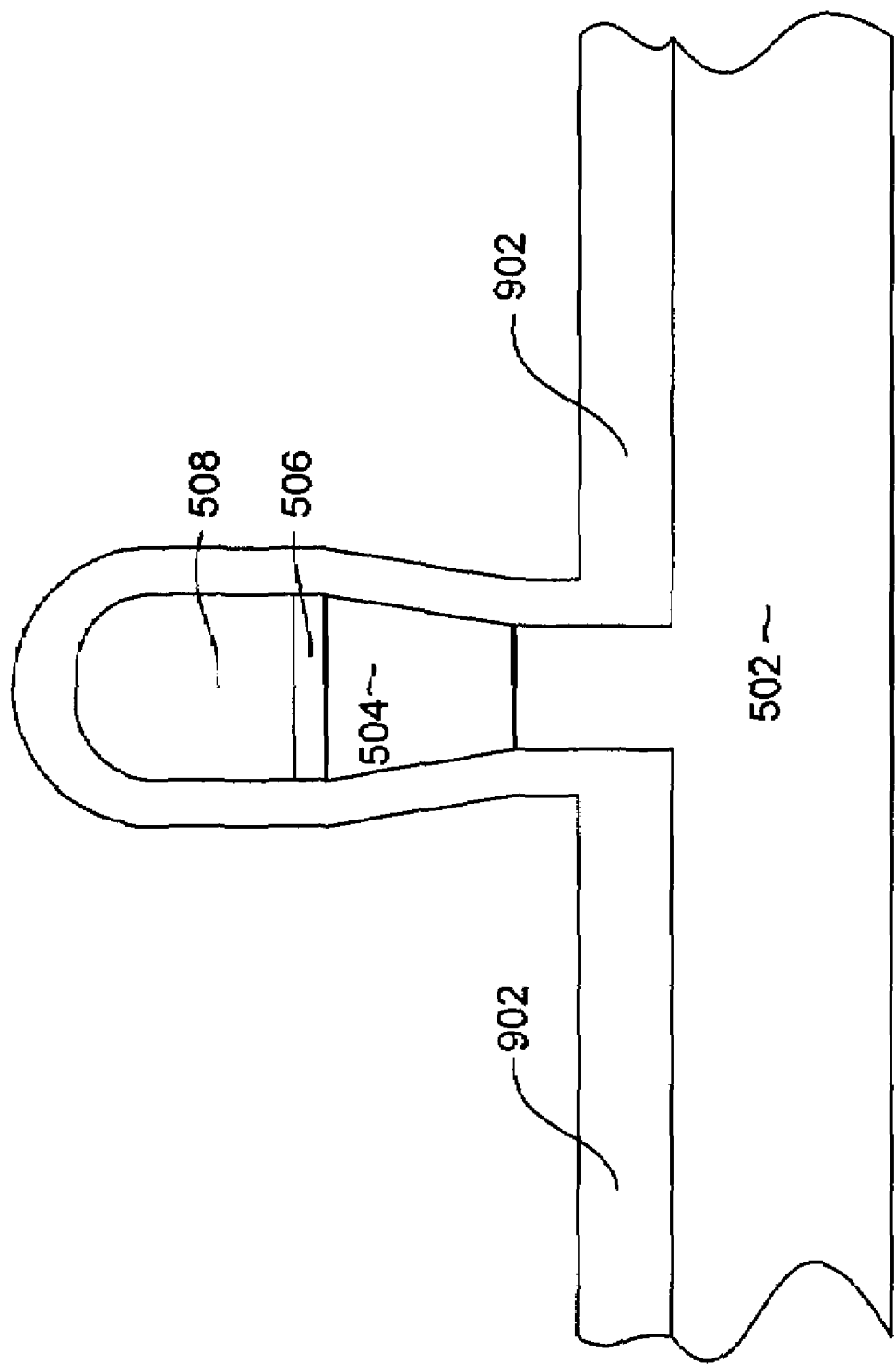

With reference now to FIG. 9, a layer of non-magnetic material 902 is deposited. The non-magnetic material 902 is preferably alumina ($Al_2O_3$) deposited by a conformal deposition method such as atomic layer deposition (ALD), chemical vapor deposition (CVD), etc. For simplicity, the layer 902 will be referred to herein as ALD layer 902. Since this ALD layer 902 will be used to define the side gap thickness of the finished write head (described in FIG. 4), the ALD layer 902 must have a certain minimum thickness at the sides of the write pole 504. However, as can be seen, the significant notching in the substrate 502, allows the ALD layer 902 to have a bottom corner 904 that is beneath (or at least at) the level of the bottom of the write pole 504 (ie. leading edge of the write pole 504).

Figure 10:
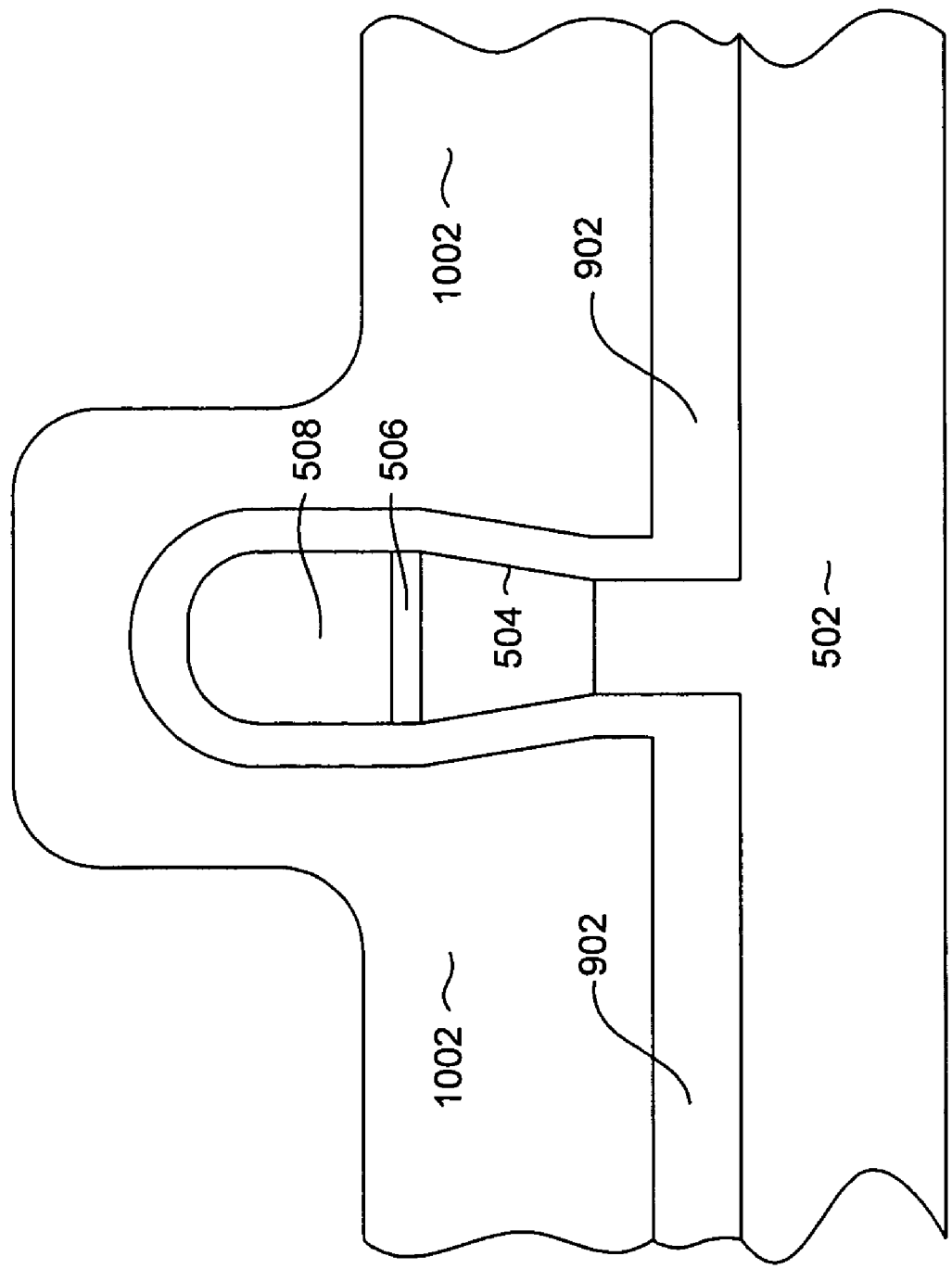
Figure 11:
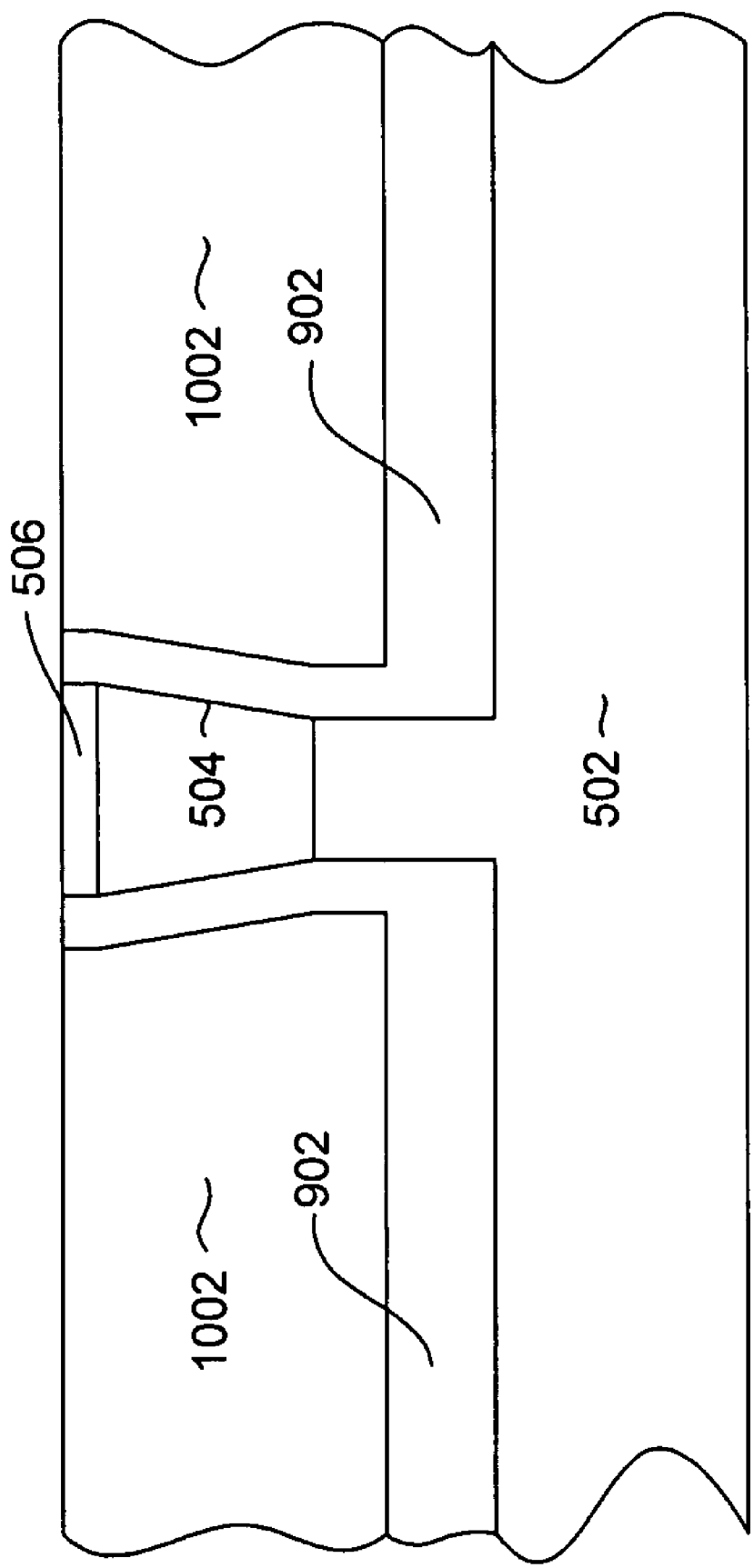
Figure 12:
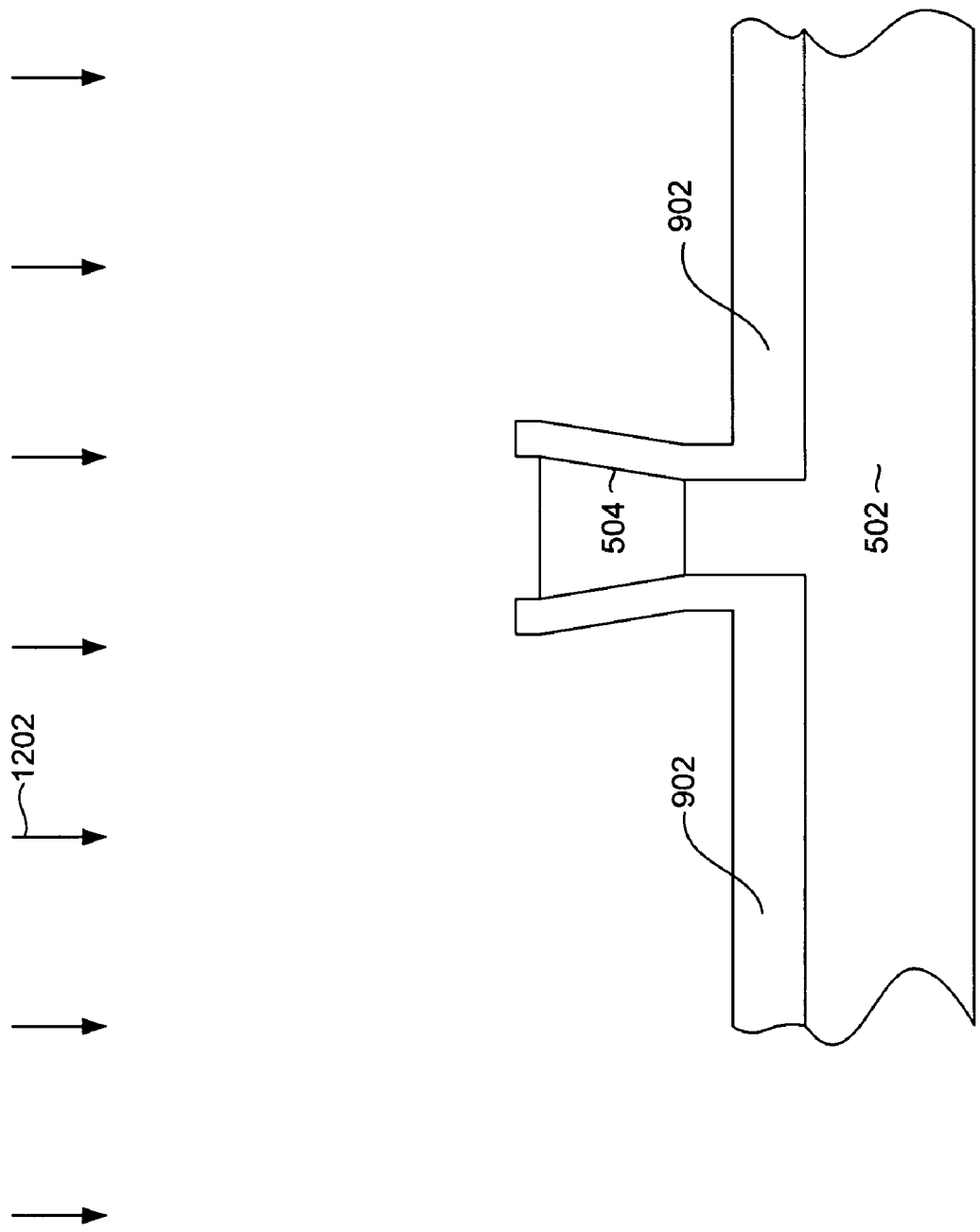

With reference now to FIG. 10, a layer of RIEable material 1002 such as $SiO_2$ is deposited to a level at least as high as the top of the write pole 504. Then, with reference to FIG. 11, a chemical mechanical polish (CMP) is performed until the hard mask 506 is reached. With reference to FIG. 12, a reactive ion etch (RIE) 1202 is then performed to remove the RIEable material 1002, and hard mask 506 (shown in FIG. 11). The REI 1202 is preferably a two part RIE. The first part is to remove the $SiO_2$ 510. The chemistry is $CF_4$. The second part is to remove the DLC 506. It is either $CO_2$ or $O_2$. The DLC layer 506 protects the top of the pole 504 from fluorine during $SiO_2$ removal to prevent corrosion.

Figure 13:
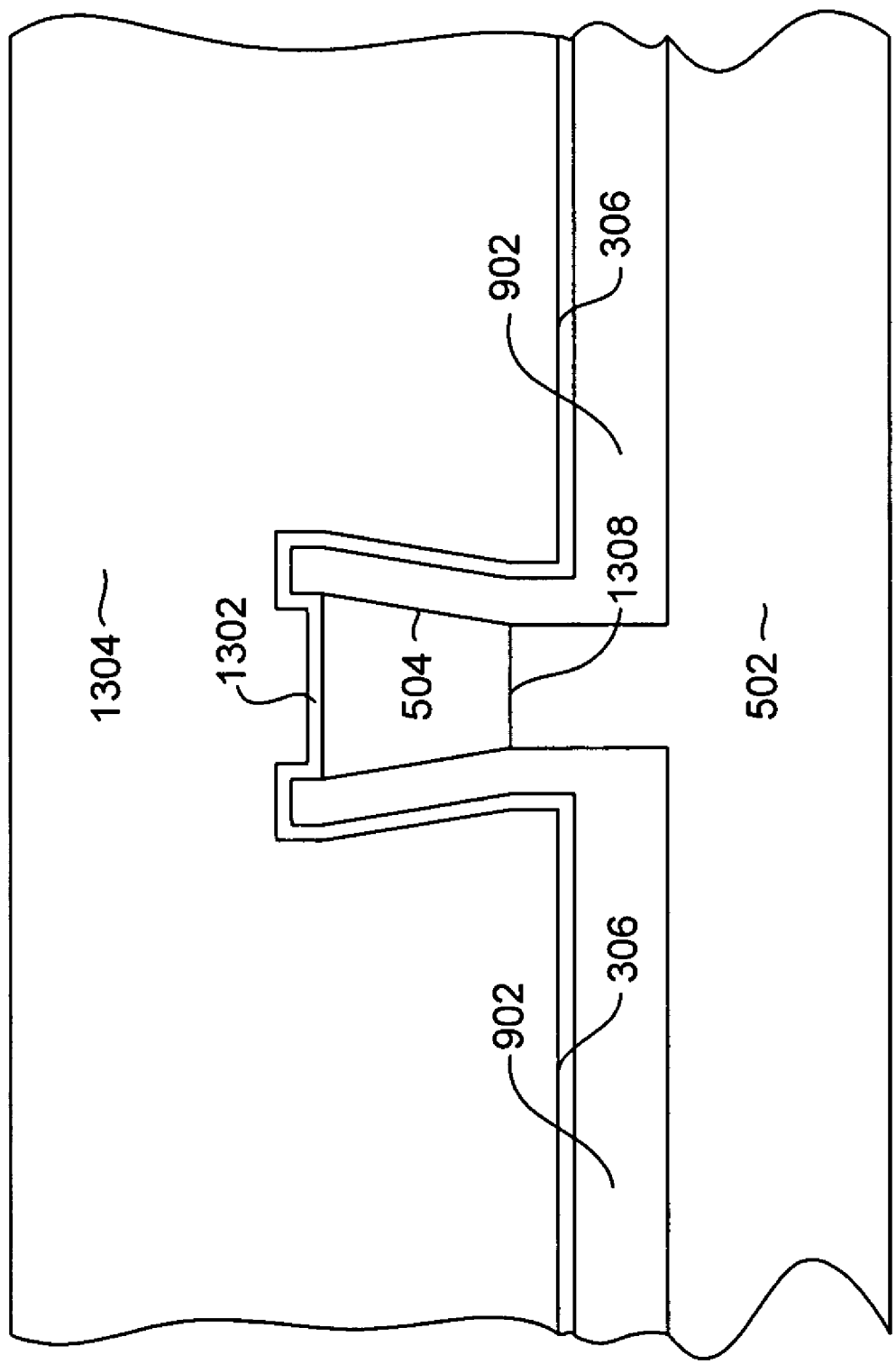

With reference now to FIG. 13, a non-magnetic, electrically conductive seed layer 1302 such as Rh is deposited to provide a plating seed layer as well as providing a non-magnetic trailing gap. The seed layer 1302, therefore, should be deposited to the thickness of the desired trailing gap TG, as described in FIG. 4. Then optionally, a magnetic material such as NiFe or CoFe can be sputter deposited to provide an adhesion layer, and a magnetic material such as NiFe or CoFe can be plated to form a wrap around trailing shield 1304. It can be seen that the bottom (or leading) edge 1306 of the trailing shield 1304 extends beyond the bottom (or leading) edge 1308 of the write pole 504. This is, of course, made possible by the notching in the substrate 504.

Figure 14:
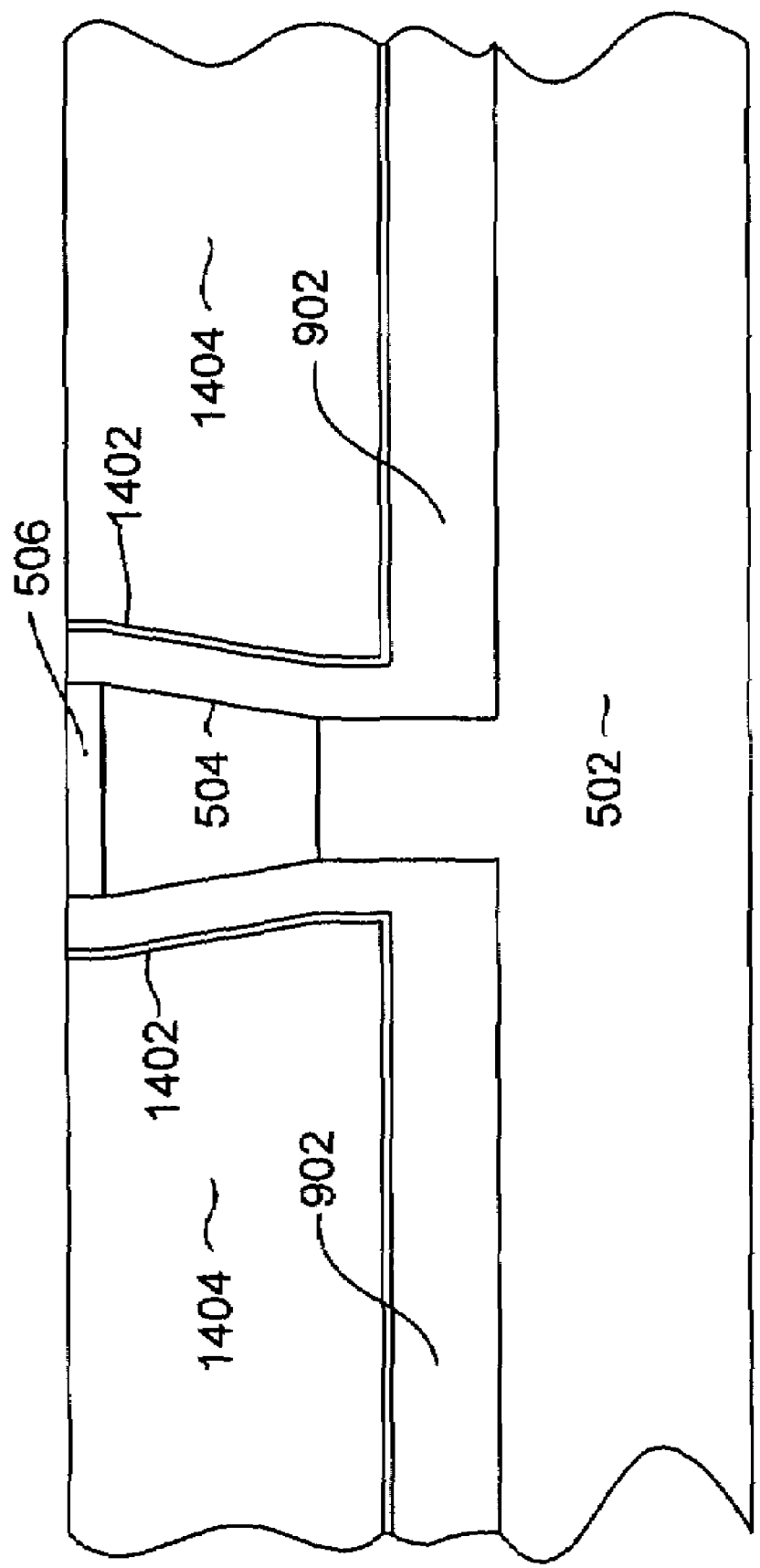

The above description illustrates a method for constructing a trailing wrap around shield. If it is desired that the shield provide a side shielding function and no trailing shielding, the method described can be modified. Starting with a structure as described with reference to FIG. 9, an electrically conductive seed layer 1402 can be deposited followed by a magnetic shield material 1404 such as NiFe or CoFe and then a fill material such as $SiO_2$ (not shown). Then a chemical mechanical polish (CMP) can be performed until the hard mask 506 is reached resulting in the structure as shown in FIG. 14. In this case, the seed layer 1402 can be either a magnetic or non-magnetic material. If a non-magnetic material is used, the ALD layer 902 should be deposited to a thickness to account for the added thickness of the seed layer 1402.

Figure 15:
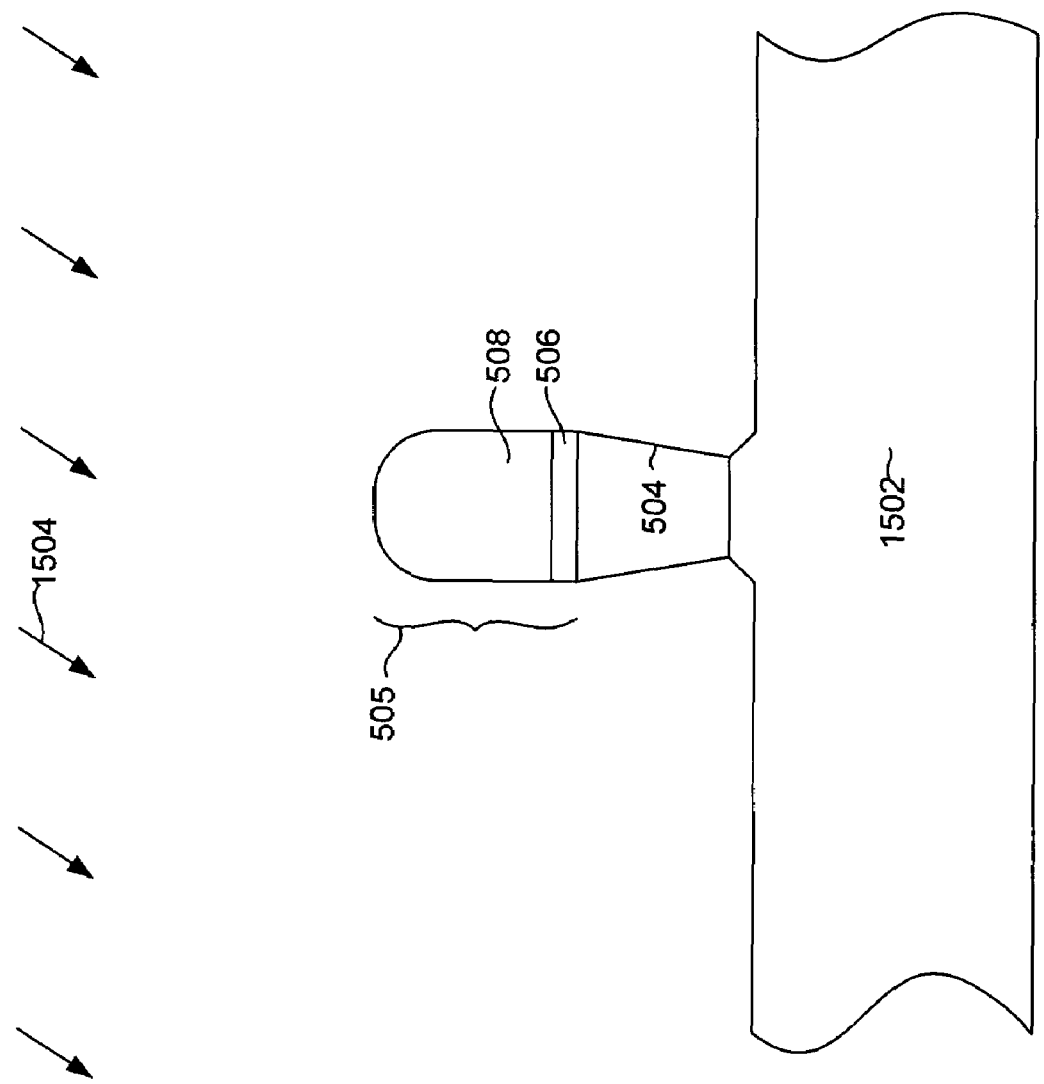

With reference now to FIGS. 15 and 16, another method for forming a recessed, notched substrate is described. FIG. 15 shows a structure similar to that described with reference to FIG. 7, except that the write pole 504 is constructed upon a substrate 1502 that comprises alumina $Al_2O_3$. An ion mill 1504 is performed in an Ar containing atmosphere (Ar mill) to form the write pole 504. As with the mill 702 described with reference to FIG. 7, the Ar mill 1504 is a sweeping ion mill performed at one or more angles relative to normal to form the write pole 504 with a desired trapezoidal shape. Then, with reference to FIG. 16, an ion mill 1602 is performed in an atmosphere containing Ar and $CHF_3$. This preferentially removes alumina, leaving write pole 504 relatively unaffected. The Ar $CHF_3$ mill 1602 also removes a good amount of the remaining BARC layer 508. In this way, the Ar $CHF_3$ mill 1602 creates the notches 1604 in the substrate 1502, needed to form a shield that extends below the leading edge of the write pole 504. A follow up Ar ion mill may be performed after the notching, Ar, $CHF_3$ mill 1602 to clean up the sides of the write pole 504 and further adjust the track-width and bevel of the write pole 504 if desired. Further processes for forming a trailing shield can be performed as described with reference to FIGS. 9-14.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A write head for perpendicular magnetic recording, comprising:
    a substrate comprising a material selected from the group consisting of $SiO_xN_y$, $SiO_2$, $SiN_4$ and $TaO_5$;
    a magnetic write pole formed on the substrate; the write pole having a leading edge adjacent to the substrate and an having first and second laterally opposed sides;
    a magnetic shield extending laterally outward from the first and second laterally opposed sides of the write pole, the magnetic shield having a leading edge that extends at least to the leading edge of the write pole.

2. A write head as in claim 1 wherein the leading edge of the magnetic shield extends beyond the leading edge of the write pole.

3. A write head as in claim 1 wherein the write pole has a trailing edge and wherein the magnetic shield is a side shield having a trailing edge that terminates at the trailing edge of the write pole.

4. A write head as in claim 1 wherein the write pole has a trailing edge and wherein the magnetic shield has a trailing portion formed adjacent to the trailing edge of the write pole and separated from the trailing edge of the write pole by a non-magnetic trailing gap.

5. A write head as in claim 1 wherein the magnetic shield is separated from the write pole by a non-magnetic gap.

6. A write head as in claim 1 wherein the substrate is notched at either side of the write pole.

7. A write head as in claim 1 wherein the substrate has a portion contacting the write pole that extends in the trailing direction and first and second laterally extending notched portions that are recessed in the leading direction.

8. A write head for perpendicular magnetic recording, comprising:
- a magnetic write pole formed on a non-magnetic material that comprises $SiO_xN_y$, $SiO_2$, $SiN_4$ or $TaO_5$, the magnetic write pole having an end disposed toward an air bearing surface ABS, and having a leading edge, a trailing edge and first and second laterally opposed sides;
- a magnetic return pole magnetically connected with the write pole at a location away from the ABS;
- an electrically conductive write coil configured to induce a magnetic flux through the write pole and return pole; and
- a magnetic shield disposed toward the ABS and extending laterally outward from the first and second sides of the write pole, the shield being separated from the write pole by a non-magnetic gap, the shield having a leading edge that extends in a leading direction at least to the level of the leading edge of the write pole.

9. A write head as in claim 8 wherein the shield extends in the leading direction beyond the leading edge of the write pole.

10. A write head as in claim 8 wherein the non-magnetic material contacts the leading edge of the write pole, the non-magnetic material having a portion contacting the write pole that is extended in the trailing direction, and laterally extending notched portions that are recessed in the leading direction.

11. A write head as in claim 8 wherein the non-magnetic material is a RIEable material.

12. A write head as in claim 8 wherein the non-magnetic material is a RIEable material and further comprising a layer of non-magnetic shield gap material extending over the trailing edge and first and second sides of the write pole.

13. A write head as in claim 12 wherein the non-magnetic shield gap material comprises alumina.

* * * * *